United States Patent [19]

Ijams et al.

[11] Patent Number: 5,431,426
[45] Date of Patent: Jul. 11, 1995

[54] ANTI-DIVE APPARATUS FOR BICYCLES

[76] Inventors: Dav Ijams, P.O. Box 1788, Richmond, Calif. 94802; John Castellano, 1509 Liberty St., El Cerrito, Calif. 94530

[21] Appl. No.: 123,132

[22] Filed: Sep. 16, 1993

[51] Int. Cl.⁶ .............................................. B62K 25/08
[52] U.S. Cl. .................................. 280/276; 280/277; 280/703
[58] Field of Search ............... 280/275, 276, 277, 279, 280/283, 703

[56] References Cited

U.S. PATENT DOCUMENTS

| | | | |
|---|---|---|---|
| 1,036,263 | 8/1912 | Kittle | 280/277 |
| 3,989,261 | 11/1976 | Kawaguchi | 280/276 |
| 4,147,371 | 4/1979 | Morita et al. | 280/276 |
| 4,159,123 | 6/1979 | Petty | 280/276 |
| 4,180,280 | 12/1979 | Doveri | 280/277 |
| 4,401,316 | 8/1983 | Miyakoshi et al. | 280/277 |
| 4,533,153 | 8/1985 | Tsunoda et al. | 280/277 |
| 4,572,534 | 2/1986 | Heyl | 280/276 |
| 4,775,163 | 10/1988 | McGowan et al. | 280/277 |
| 4,776,609 | 10/1988 | Pan et al. | 280/703 |
| 4,997,197 | 3/1991 | Shultz | 280/275 |
| 5,156,231 | 10/1992 | Trema | 180/227 |

FOREIGN PATENT DOCUMENTS

| | | | |
|---|---|---|---|
| 0559088 | 9/1923 | France | 280/276 |
| 3833880 | 4/1990 | Germany | 280/276 |
| 0426686 | 11/1947 | Italy | 280/276 |

OTHER PUBLICATIONS

Mountain Bike Action, May 1992, p. 17.
Mountain Bike, Jun. 1992, pp. 20–21.
Line drawing of existing motor scooter front suspension.

*Primary Examiner*—Margaret A. Focarino
*Assistant Examiner*—Johnson Victor E.
*Attorney, Agent, or Firm*—Thomas R. Lampe

[57] ABSTRACT

Anti-dive apparatus for a bicycle including a front wheel suspension, a rim brake, and a support for the rim brake which moves the rim brake relative to the front bicycle wheel and the front wheel suspension responsive to application of an external force to the front bicycle wheel.

7 Claims, 2 Drawing Sheets

ANTI-DIVE APPARATUS FOR BICYCLES

TECHNICAL FIELD

This invention relates to bicycle front suspensions and, more particularly, to an anti-dive suspension system.

BACKGROUND ART

Various types of suspension systems have been tried on the front wheel of bicycles. Most prior systems "dive" upon braking, meaning that the front of the bicycle suddenly moves downward upon application of the front brake. This phenomenon is known as brake dive. It is a problem on bicycles because their front suspensions usually have only about five cm of travel (wheel movement). Brake dive can use up over half of an already short travel, leaving only two cm or so of travel for bump absorption.

Brake dive is due to a combination of braking force pushing horizontally backwards on the front wheel, and weight transfer to the front wheel. Because the rider of a bicycle sits so high, when braking there is a large transfer of weight to the front wheel which tends to compress the front suspension. In addition, on most prior suspensions the horizontal braking force on the front tire increases the compression, resulting in excessive brake dive.

A related problem has to do with the path that the front wheel axle follows as the suspension moves. The most common type of front bicycle suspension is a telescopic fork where tubes slideably engage to provide suspension motion. This type of fork is almost universally used on motorcycles. Telescopic forks provide an axle path which follows a straight line with respect to the frame of the vehicle. The axle moves up and back as the suspension is compressed. While this motion allows the wheel to move away from large bumps, the backward braking force can push the axle back, and thus upward. As a result, telescopic forks dive. Another problem with telescopic suspensions is that they also tend to suffer from high sliding friction, which causes harshness.

Another type of suspension is the trailing link, which might be called "knee action" because of its similarity with the human leg. There is an upper leg which is rigidly attached to the bicycle frame, except for steering action. A pivot or knee, at the end of the upper leg, allows the lower leg or trailing link to swing in an arc. The wheel axle is attached, directly or indirectly to the trailing link. The axle arcs back and then up as the suspension compresses, a motion which improves absorption of large bumps by allowing the wheel to move back and away from the bump. This helps avoid flat tires caused by pinching the tube between the wheel rim and a rock. Unfortunately, the axle path of a trailing link suspension worsens the brake dive problem because the axle path is almost directly in line with the combined forces of weight transfer and braking. The only prior trailing link bicycle suspension used a disk brake, where the brake caliper was mounted on a four bar linkage arranged to reduce dive. It was thought that a hub brake, such as a disk brake, was necessary to make a working trailing link suspension. Hub brakes are heavier and more expensive than rim brakes, which are normally used on bicycles.

The third major category of front suspensions is the leading link type. This is similar to a trailing link suspension, except reversed front to back. A pivoting link extends from a fixed leg forward to the wheel axle. The main problem with this arrangement is that the axle now arcs in an undesireable manner. The axle moves upward and then back, relative to the bicycle frame. This action makes the suspension harsher on sharp bumps. It also causes undesireable changes in steering geometry. Because the axle moves farther from the steering axis when initially compressed, steering stability is lessened on bumps. Also, it was thought that a hub brake was necessary to get anti-dive action on a leading link suspensions.

Some leading link suspensions use an arrangement with two leading links on each side, mounted well above the axle, and angled so that the axle path mimics that of a trailing link suspension. The problem with these designs is that brake dive is worsened, and it cannot easily be remedied.

In summary, most prior art suspensions are "pro-dive" in that braking force tends to compress the suspension. No prior suspension using rim brakes has correctly balanced the forces at work to provide "anti-dive" action. The only anti-dive suspensions to date have used hub brakes, which are expensive and heavy.

DISCLOSURE OF INVENTION

The present invention provides a bicycle suspension which utilizes braking thrust force to neutralize weight transfer, producing no dive, or a predetermined degree of dive.

The primary advantage of this anti-dive action is that much more suspension travel remains available for bump absorption during braking.

In addition, this suspension allows use of standard rim brakes while achieving anti-dive action.

Another advantage is that this system provides an upwardly curved axle path, if desired, so it can absorb big bumps but resist bobbing up and down under cyclical pedaling loads.

MODES FOR CARRYING OUT THE INVENTION

Figure 1:
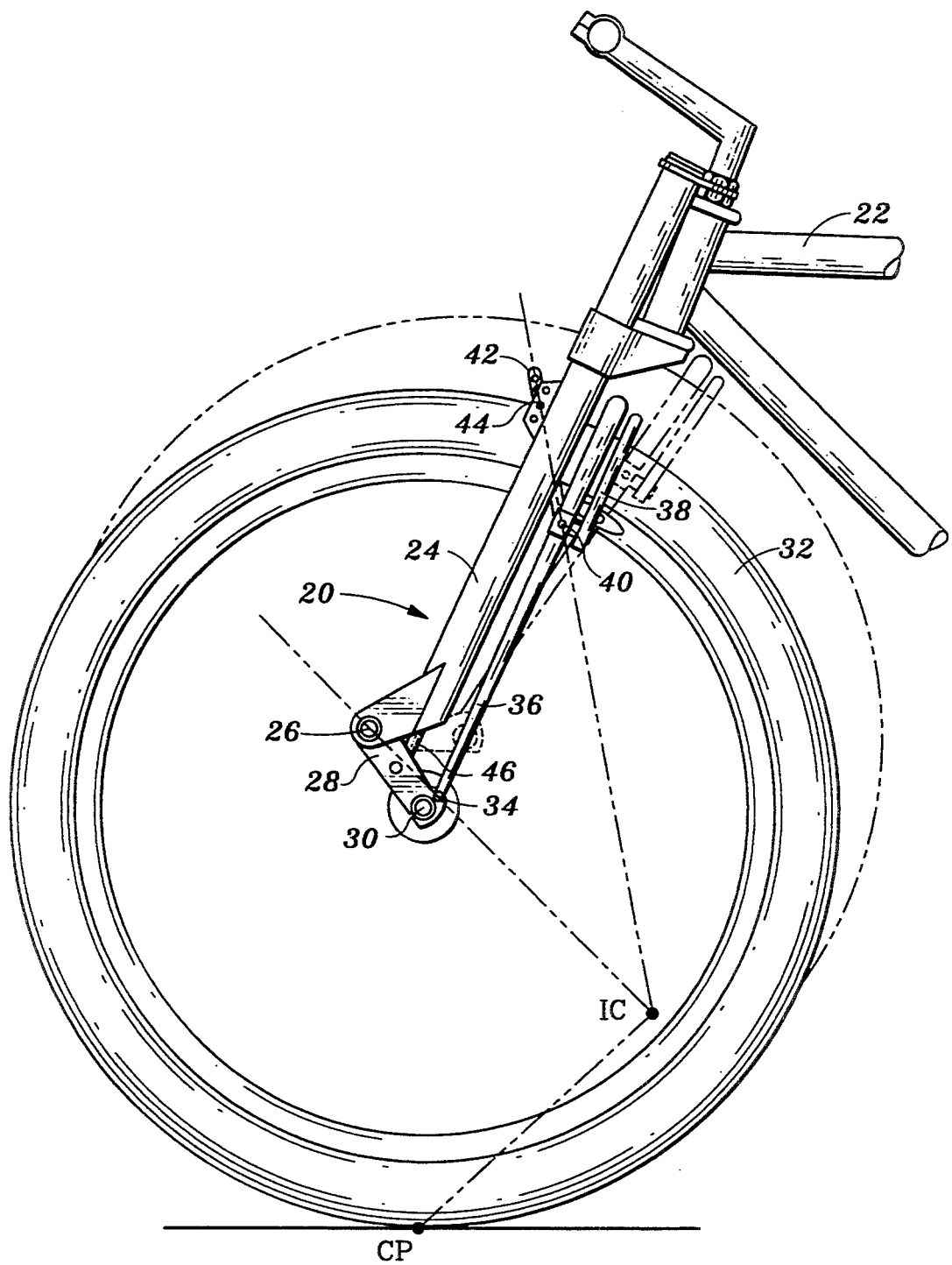
FIG. 1 is a side view, presented in somewhat diagrammatic fashion, of a bicycle incorporating a preferred form of apparatus constructed in accordance with the teachings of the present invention.

FIG. 1 shows a preferred embodiment of the invention. A front fork assembly 20 is pivotably mounted on upon a bicycle frame 22 in the conventional manner, to allow the bicycle to be steered. On each side of fork assembly 20, a first suspension member in the form of a fork blade 24 extends downwardly and forwardly from frame 22, terminating at a first pivot point 26. A trailing link 28 extends from first pivot 26 downwardly and rearwardly to a front wheel axle 30. A front wheel 32 is conventionally mounted on bearings to rotate about axle 30. Just above axle 30 is a second pivot point 34. Alternatively, axle 30 may be coaxial with second pivot point 34. Rising from second pivot 34 is a second suspension member in the form of a brake support 36, which is approximately parallel to fork blade 24. Mounted near the top of brake support 36 is a rim brake mechanism 38 which may be virtually any commercially available bicycle brake. Brake 38 is positioned to press on the rim of front wheel 32 to produce braking action. Near the point at which the brake is mounted, a third pivot point 40 is located connecting brake support 36 to an upper link 42. Upper link 42 rises to meet the top of fork blade 24 at a forth pivot point 44. Blade 24, support 36, trailing link 28 and upper link 42 form a four-bar-linkage to allow controlled motion of support 36 with respect to blade 24. The apparatus is shown in its unladen condition in solid lines, and in its fully loaded or compressed position in phantom lines.

Partially hidden inside the bottom end of blade 24, a shock absorber 46 pushes downward on trailing link 28 to support the weight of the rider and bicycle. Shock absorber 46 can simply be a column of flexible material such as an elastomer or elastomer foam, which is compressed as the suspension is compressed. Alternately shock absorber 46 can be an air shock which incorporates an air spring with oil damping, or other type of spring and damping device.

Adjustability of the anti-dive action can be provided by the inclusion of several positions for one or more of the pivot points. In FIG. 1, fourth pivot 44 can be adjusted to pivot at any of three holes at the top of blade 24. Optionally, the length of one of the links can be adjustable. Upper link 42 is shown with several holes in its end allowing link length to be adjusted.

The entire mechanism described above is duplicated on the opposite side of front wheel 32. Support 36 is connected to the corresponding support on the opposite side, so that they move in unison.

Figure 2:
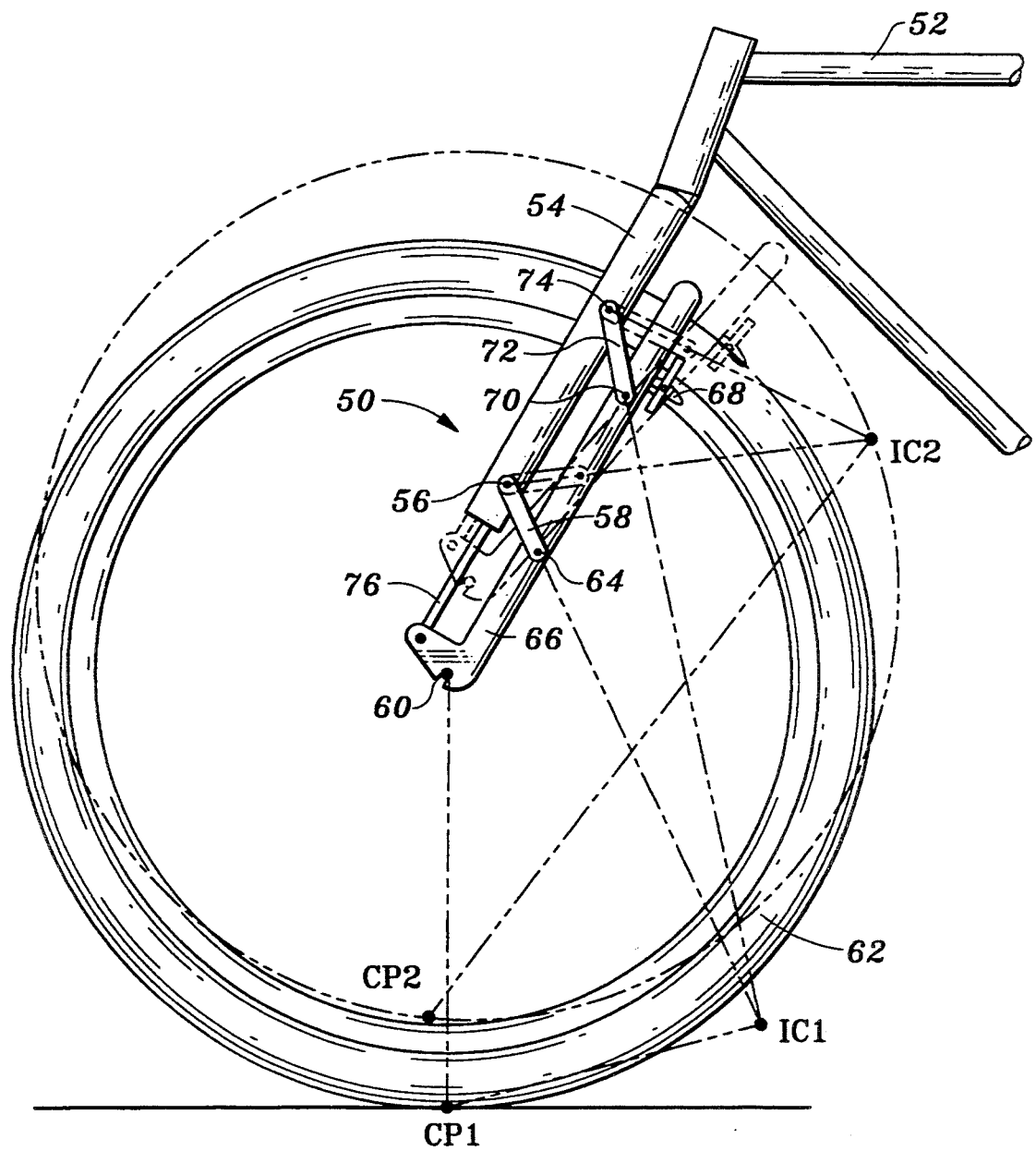
FIG. 2 is a similar view of a bicycle incorporating an alternative form of apparatus constructed in accordance with the teachings of the present invention.

FIG. 2 shows an alternative embodiment of the invention. A front fork assembly 50 is pivotably mounted on upon a bicycle frame 52 in the conventional manner, to allow the bicycle to be steered. On each side of fork assembly 50, a suspension member in the form of a fork blade 54 extends downwardly and forwardly from frame 52, terminating at a first pivot point 56. A trailing link 58 extends from first pivot 56 downwardly and rearwardly to a second pivot point 64 on a brake mounting member or second suspension member or support 66. Below second pivot point a front wheel axle 60 is mounted to brake support 66. A front wheel 62 is conventionally mounted on bearings to rotate about axle 60. Brake support 66, which is approximately parallel to fork blade 54. Mounted near the top of brake support 66 is a rim brake mechanism 68 which may be virtually any commercially available bicycle brake. Brake 68 is positioned to press on the rim of front wheel 62 to produce braking action. Near the point at which the brake is mounted, a third pivot point 70 is located connecting brake support 66 to an upper link 72. Upper link 72 rises to meet the fork blade 54 at a forth pivot point 74. Blade 54, support 66, trailing link 58 and upper link 72 form a four-bar-linkage to allow controlled motion of support 66 with respect to blade 54. The apparatus is shown in its unladen condition in solid lines, and in its fully loaded or compressed position in phantom lines.

Partially hidden inside the bottom end of blade 54, a shock absorber 76 pushes downward on support 66 to support the weight of the rider and bicycle. Shock absorber 76 can simply be a column of flexible material such as an elastomer or elastomer foam, which is compressed as the suspension is compressed. Alternately shock absorber 76 can be an air shock which incorporates an air spring with oil damping, or other type of spring and damping device.

The entire mechanism described above is duplicated on the opposite side of front wheel 62. Upper link 72 may be connected to the corresponding link on the opposite side (not shown), so that they move in unison.

Operation

With respect to the FIG. 1 embodiment, when the bicycle is moving forward and front wheel 32 encounters a bump, the wheel moves upward, compressing shock absorber 46 to the compressed position shown in phantom.

This suspension is different from earlier linkage-type suspensions with rim brakes because of the way brake support 36 moves with respect to the frame of the bicycle as the suspension moves through its range of motion.

Comparing the two positions shown for brake support 36, it can be appreciated that the support rotates with respect to the bicycle frame. The key to achieving anti-dive action is to have the brake support rotate, when the suspension is being compressed, in a direction opposite the way the wheel turns.

The point about which the brake support rotates in FIG. 1 (with respect to frame 22) is just behind front wheel 32. The position of this point of rotation (labelled IC in FIG. 1) determines the amount of anti-dive action. Point IC may be found as follows.

The point about which the brake support rotates can be found by drawing a line which passes through first pivot 26 and second pivot 34. Next another line is drawn through third pivot 40 and fourth pivot 44. These two lines are extended until they intersect. This intersection point is called the "instantaneous center of rotation", or IC, of brake support 36. This is the point about which brake support 36 rotates as the links move. The location of point IC is best described by an angle as follows.

A line is drawn from the center of the contact patch, where the front wheel touches the ground, to the instantaneous center. The angle of line CPIC determines the amount of anti-dive. If point IC is above ground as shown, the angle of the line is positive. If point IC is below ground, the ground angle of line CPIC is negative.

Now the amount of anti-dive effect for a given location of point IC can be described. If the angle of line CPIC is approximately 40 to 45 degrees, there is substantially complete balancing of forces and no brake dive. If the angle is chosen to be less than 40 degrees, partial anti-dive is realized. The angle of line CPIC must be lowered to about −25 degrees (i.e. point IC is below ground) before the amount of brake dive is the same as a telescopic fork.

The origin of the abovementioned 40 to 45 degree line is as follows. The location of point IC which gives no dive is anywhere along a line extending from the front contact patch to a point directly above the axle of the rear wheel (not shown) at a height equal to the height of the center of gravity of the bicycle with rider. The angle of this line ranges from approximately 40 degrees for a small-framed bicycle to about 45 degrees for a large framed bicycle. Thus if the angle of line CPIC is approximately 40 to 45 degrees, complete anti-dive is achieved.

We have found, through calculation and experiment, that the beneficial effects of anti-dive may be felt if the angle of line CPIC is between −15 and +60 degrees. The suspension performs best if the angle is between 0 and +55 degrees. We believe the optimum angle range for line CPIC is from +15 to +50 degrees.

Point IC moves as suspension moves through its range of motion, and hence the angle of line CPIC can change. FIG. 2 shows how the angle (line CPIC1) increases as the suspension is compressed (line CPIC2). This causes anti-dive action to increase as the suspension is compressed. This produces partial anti-dive when suspension is only partly compressed, progressing to full anti-dive as suspension is fully compressed. The effect is similar to employing stiffer springing, but only when the brakes are applied. Progressive anti-dive gives the forks a nice feel while braking over bumps. There is more resistance to bottoming out on big bumps, yet the suspension remains supple for small bumps. Progressive anti-dive may be achieved by making upper link 72 longer than lower link 58.

Adjustable Anti-Dive

The anti-dive action can be made adjustable by providing an adjustable pivot point for one of the links. For example in FIG. 1, three holes are provided on blade 24 to allow selection of pivot location. Changing from the middle to the upper pivot position moves point IC closer to axle 30, thereby increasing the angle of line CPIC, and increasing the amount of anti-dive. This allows the user to adjust the suspension to suit personal preference.

The progressiveness of the anti-dive action can also be made adjustable. If upper link 42 has multiple holes as shown, then changing the pivot to a hole closer to the end of the link increases the progressiveness of the anti-dive, giving the effect of stiffer suspension springs.

CONCLUSIONS, RAMIFICATIONS, AND SCOPE

In summary, this is the first bicycle suspension to incorporate anti-dive action using conventional rim brakes. Additionally, the preferred trailing link embodiment offers an improved axle path for better bump absorption.

While the above description contains many specificities, these should not be construed as limitations on the scope of the invention, but rather as an exemplification of preferred embodiments.

Many variations are possible without departing from the full scope of the invention. For example, leading links can be used instead of trailing links. As long as they converge on an instantaneous center point located as described above, the desired anti-dive action will be achieved. Also the suspension links may be built into the bicycle frame rather than the fork as described. Here the links would not turn with the wheel as the bicycle is steered, but again, if the links converge as described, the suspension will not dive upon braking. Another variation is to use sliders, cams, or hydraulic cylinders to cause the brake support member to rotate about an instantaneous center as described.

Accordingly, the scope of the invention should not be determined by the embodiments illustrated, but by the appended claims and their legal equivalents.

We claim:

1. Bicycle anti-dive apparatus comprising, in combination:

a bicycle frame;

a front fork assembly connected to the bicycle frame and including a fork blade;

a lower trailing link pivotally connected to said fork blade at a first pivot point on said fork blade and extending behind said fork blade;

a rim brake support located behind said fork blade pivotally connected to said lower trailing link at a second pivot point spaced from said first pivot point and extending upwardly from said lower trailing link;

a front bicycle wheel having a front wheel rim and connected to one of said lower rim brake support and said trailing link and movable upwardly toward and downwardly away from said bicycle frame upon pivotal movement of said lower trailing link about said first pivot point;

a rim brake supported by said rim brake support at a location spaced from said second pivot point selectively engageable with the front wheel rim; and an upper trailing link located above said lower trailing link, pivotally connected to the rim brake support at a third pivot point spaced from both said first and second pivot points, and pivotally connected to the front fork assembly at a fourth pivot point spaced from said first, second, and third pivot points, said lower trailing link, said upper trailing link, and said front fork assembly being cooperable and responsive to upward movement of said front bicycle wheel relative to said bicycle frame to rotate said rim brake support in a direction opposite the direction of rotation of said front bicycle wheel about an instantaneous center of rotation relative to said bicycle frame located behind the front fork assembly at the intersection of a first imaginary line extending through the first and second pivot points and a second imaginary line extending through the third and fourth pivot points, said rim brake being continuously maintained alongside the front wheel rim during rotation of the rim brake support about the instantaneous center of rotation.

2. The apparatus according to claim 1 wherein a third imaginary line extending between the center of the contact patch where the front bicycle wheel touches the ground and said instantaneous center of rotation forms an angle with the ground within the range of from about +15 degrees to about +50 degrees at all times.

3. The apparatus according to claim 1 wherein aid front bicycle wheel includes an axle mounted on said lower trailing link.

4. The apparatus according to claim 1 wherein said front bicycle wheel includes an axle mounted on said rim brake support.

5. The apparatus according to claim 1 additionally comprising a shock absorber connected to said lower trailing link.

6. The apparatus according to claim 1 additionally comprising a shock absorber connected to said rim brake support.

7. The apparatus according to claim 1 wherein said third pivot point is closely adjacent to said rim brake.

* * * * *